(12) United States Patent
Kang et al.

(10) Patent No.: US 9,767,746 B2
(45) Date of Patent: *Sep. 19, 2017

(54) DISPLAY DEVICE

(71) Applicant: SAMSUNG DISPLAY CO., LTD., Yongin-si, Gyeonggi-do (KR)

(72) Inventors: Nam-Soo Kang, Ansan-si (KR); Seong-Young Lee, Seoul (KR); Sung-Man Kim, Seoul (KR); Seung-Hwan Moon, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,827

(22) Filed: Oct. 24, 2016

(65) Prior Publication Data

US 2017/0039965 A1 Feb. 9, 2017

Related U.S. Application Data

(63) Continuation of application No. 14/223,883, filed on Mar. 24, 2014, now Pat. No. 9,478,178, which is a (Continued)

(30) Foreign Application Priority Data

Apr. 19, 2004 (KR) .................. 10-2004-0026753

(51) Int. Cl.
G09G 3/36 (2006.01)
G02F 1/1362 (2006.01)

(52) U.S. Cl.
CPC ..... G09G 3/3614 (2013.01); G02F 1/136286 (2013.01); G09G 3/36 (2013.01);
(Continued)

(58) Field of Classification Search
None
See application file for complete search history.

(56) References Cited

U.S. PATENT DOCUMENTS 5,790,090 A 8/1998 Libsch et al.
5,867,139 A 2/1999 Tanaka et al.
(Continued)

FOREIGN PATENT DOCUMENTS

JP 02-042420 2/1990
JP 09-288260 11/1997
(Continued)

Primary Examiner — Seokyun Moon
(74) Attorney, Agent, or Firm — Innovation Counsel LLP

(57) ABSTRACT

A display device includes a pixel matrix having pixel rows and pixel columns and including pixels having switching elements positioned alternately at a corner near an upper and a lower side of each pixel row and positioned alternately at a corner near an upper and a lower side of and alternately at a corner near a left and a right side of each pixel column; multiple pairs of gate lines transmitting a gate-on voltage; and multiple data lines transmitting data voltages, wherein each pair of gate lines are disposed at the upper and lower sides of each pixel row with the pixels in each row connected to the gate line positioned nearest the respective switching element, and each data line is disposed between adjacent pairs of pixel columns and connected to pairs of pixels where one pixel of the pair has a switching element positioned nearest the respective data line.

11 Claims, 5 Drawing Sheets

Related U.S. Application Data continuation of application No. 11/109,607, filed on Apr. 18, 2005, now Pat. No. 8,681,083.

(52) U.S. Cl.
CPC ......... *G09G 3/3648* (2013.01); *G09G 3/3655* (2013.01); *G09G 3/3611* (2013.01); *G09G 2300/0413* (2013.01); *G09G 2300/0426* (2013.01); *G09G 2300/0452* (2013.01); *G09G 2310/08* (2013.01); *G09G 2320/0209* (2013.01); *G09G 2320/0247* (2013.01)

(56) References Cited

U.S. PATENT DOCUMENTS

| | | |
|---|---|---|
| 6,040,813 A | 3/2000 | Takubo |
| 6,429,842 B1 | 8/2002 | Shin et al. |
| 6,707,441 B1 | 3/2004 | Hebiguchi et al. |
| 8,681,083 B2 | 3/2014 | Kang et al. |
| 2004/0012554 A1 | 1/2004 | Song et al. |
| 2004/0246404 A1 | 12/2004 | Elliott et al. |

FOREIGN PATENT DOCUMENTS

| | | |
|---|---|---|
| JP | 10-073843 | 3/1998 |
| JP | 10-104576 | 4/1998 |
| JP | 10-171412 | 6/1998 |
| JP | 11-326869 | 11/1999 |
| JP | 2003-315766 | 11/2003 |
| KR | 10-2002-0072723 | 9/2002 |
| TW | 200301455 | 7/2003 |

DISPLAY DEVICE

CROSS-REFERENCE TO RELATED APPLICATION

This application is a continuation application of U.S. patent application Ser. No. 14/223,883 filed on Mar. 24, 2014, which claims priority to U.S. patent application Ser. No. 11/109,607 filed on Apr. 18, 2005, which claims priority to Korean Patent Application No. 10-2004-0026753, filed on Apr. 19, 2004 in the Korean Intellectual Property Office (KIPO), and all the benefits accruing therefrom under 35 U.S.C. §119, the contents of the prior applications being herein incorporated by reference.

BACKGROUND OF THE INVENTION (a) Field of the Invention

The present invention relates to a display device.

(b) Description of Related Art

An active type display device such as an active matrix (AM) liquid crystal-display (LCD) and an active matrix organic light emitting display (OLED) includes a plurality of pixels arranged in a matrix and including switching elements and a plurality of signal lines such as gate lines and data lines for transmitting signals to the switching elements. The switching elements of the pixels selectively transmit data signals from the data lines to the pixels in response to gate signals from the gate lines for displaying images. The pixels of the LCD adjust transmittance of incident light depending on the data signals, while those of the OLED adjust luminance of light emission depending on the data signals.

The display device further includes a gate driver for generating and applying the gate signals to the gate lines and a data driver for applying the data signals to the data lines. Each of the gate driver and the data driver generally includes several driving integrated circuit (IC) chips. The number of the IC chips is preferably small to reduce manufacturing cost. In particular, the number of the data driving IC chips is important since the data driving IC chips are much expensive than the gate driving IC chips.

In the meantime, an LCD includes a pair of panels provided with field generating electrodes and a liquid crystal (LC) layer having dielectric anisotropy, which is disposed between the two panels. The field generating electrodes generally include a plurality of pixel electrodes connected to switching elements such as thin film transistors (TFTs) to be supplied with data voltages and a common electrode covering an entire surface of a panel and supplied with a common voltage. A pair of field generating electrodes that generate the electric field in cooperation with each other and a liquid crystal disposed therebetween form so called a liquid crystal capacitor.

The LCD applies the voltages to the field generating electrodes to generate electric field to the liquid crystal layer, and the strength of the electric field can be controlled by adjusting the voltage across the liquid crystal capacitor. Since the electric field determines the orientations of liquid crystal molecules and the molecular orientations determine the transmittance of light passing through the liquid crystal layer, the light transmittance is adjusted by controlling the applied voltages, thereby obtaining desired images on the display.

In order to prevent image deterioration due to long-time application of the unidirectional electric field, etc., polarity of the data voltages with respect to the common voltage is reversed every frame, every row, or every dot.

Among various inversion types, a dot inversion reversing the data voltage polarity every given number of pixels reduces vertical crosstalk or vertical flickering due to the kickback voltage, thereby improving the image quality. However, the polarity inversion of the data voltages flowing in each data line may require complicated driving scheme and may cause signal delay. Although the signal delay may be reduced by employing low resistivity metal, etc., it may complicate the manufacturing process and increase the production cost.

On the contrary, a column inversion reverses the voltage polarity every given number of pixel columns. Since column inversion does not reverse the polarity of the data voltages applied to each data line during one frame, the issue of the signal delay is remarkably reduced.

However, the column inversion is inferior to the dot inversion in terms of vertical crosstalk and vertical flickering, etc.

SUMMARY OF THE INVENTION

A display device is provided, which includes: a pixel matrix having pixel rows and pixel columns and including a plurality of pixels having switching elements, the switching elements for pixels on each pixel row being positioned alternately at a corner near an upper side and a lower side of each pixel row, the switching elements for pixels on each pixel column being positioned alternately at a corner near an upper side and a lower side of each pixel column and also positioned alternately at a corner near a left side and a right side of each pixel column; a plurality of pairs of gate lines connected to the switching elements and transmitting a gate-on voltage for turning on the switching elements; and a plurality of data lines connected to the switching elements and transmitting data voltages, wherein each pair of gate lines are disposed at the upper and lower sides of each pixel row with the switching elements of the pixels in each pixel row being connected to the gate line positioned nearest the respective switching element, and each data line is disposed between adjacent pairs of pixel columns and connected to switching elements associated with the pairs of pixels where one pixel of the pairs has a switching element positioned nearest the respective data line.

Each pair of pixels having switching elements connected to the same data line may be disposed in the same pixel row.

Two pixels in each pixel row disposed between two adjacent data lines may have switching elements connected to the same data line, and two adjacent pixels in each pixel column may have switching elements connected to different data lines.

The polarity of the data voltages transmitted by adjacent data lines may be opposite to each other, and the polarity of the data voltages transmitted by each data line may be constant.

An apparent inversion of the display device may be 1×2 dot inversion.

The display device may further include a dummy line for connecting the switching element of at least one of the pixels in a leftmost pixel column to a rightmost one of the data lines or for connecting the switching element of at least one of the pixels in a rightmost pixel column to a leftmost one of the data lines.

A display device is provided, which includes: a plurality of pixel rows including a plurality of first and second pixels arranged alternately in each pixel row, each of the first and second pixels including a switching element positioned at a corner of the pixel; a plurality of first signal lines connected to the first pixels; a plurality of second signal lines connected to the second pixels; a plurality of third signal lines intersecting the first and the second signal lines, each of the third signal lines disposed between pairs of the first and the second pixels adjacent to each other and connected to one of the pairs of the first and the second pixels; and a fourth line for connecting a leftmost one of the pixels to a rightmost one of the third signal lines or for connecting a rightmost one of the pixels to a leftmost one of the third signal lines, wherein each of the third signal lines is connected to pairs of the first and the second pixels, the first pixels in the pairs of the first and the second pixels having switching elements positioned nearest the respective third signal line.

Each pair of the first and the second pixels connected to a respective third signal line may be disposed in the same pixel row.

The first and second pixels in each pixel row disposed between two adjacent third signal lines may be connected to the same third signal line.

The first and second pixels adjacent to each other in a column direction may be connected to different third signal lines.

BRIEF DESCRIPTION OF THE DRAWINGS

The present invention will become more apparent by describing embodiments thereof in detail with reference to the accompanying drawing in which.

DETAILED DESCRIPTION OF EMBODIMENTS

Figure 1:
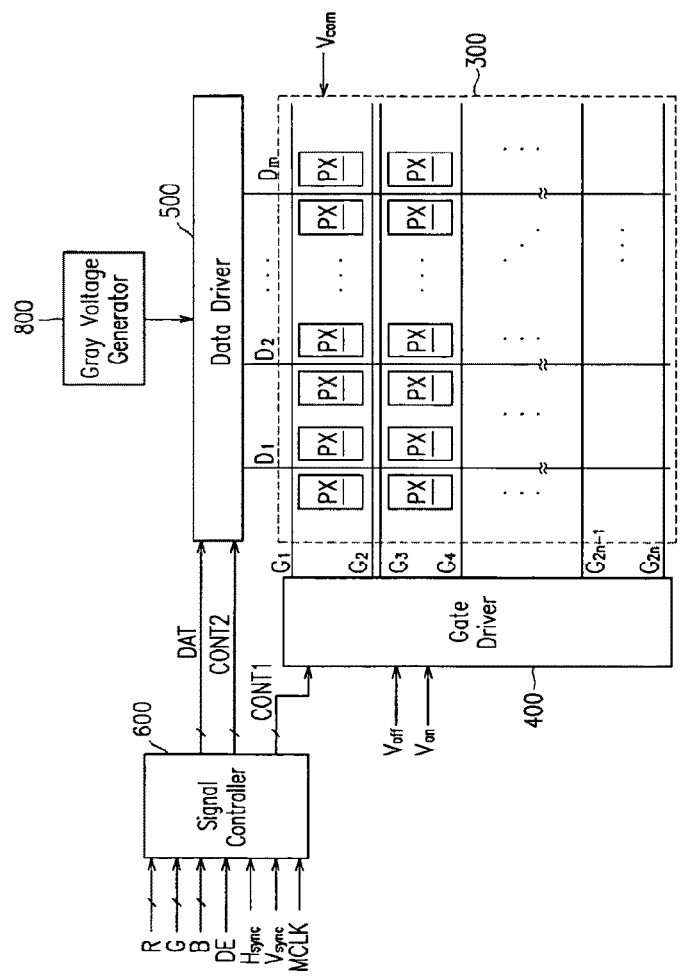
FIG. 1 is a block diagram of an LCD according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Then, liquid crystal displays as an example of display device according to embodiments of the present invention will be described with reference to the accompanying drawings.

Figure 2:
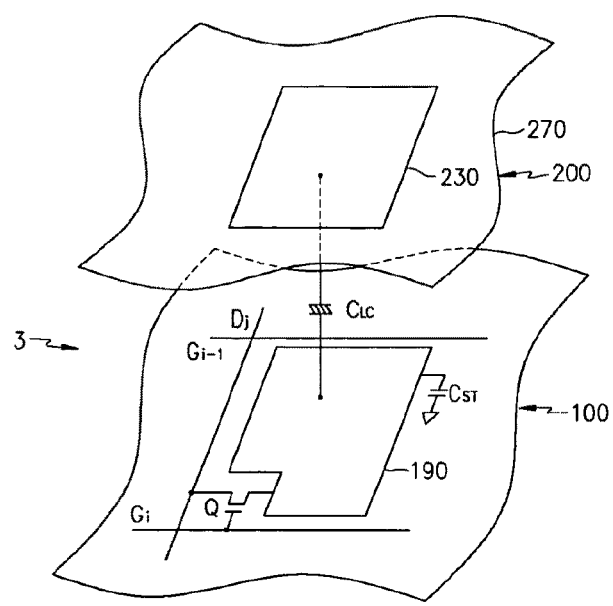
FIG. 2 is an equivalent circuit diagram of a pixel of an LCD according to an embodiment of the present invention.

FIG. 1 is a block diagram of an LCD according to an embodiment of the present invention, and FIG. 2 is an equivalent circuit diagram of a pixel of an LCD according to an embodiment of the present invention.

Referring to FIG. 1, an LCD according to an embodiment includes a LC 5 panel assembly 300, a gate driver 400 and a data driver 500 that are connected to the panel assembly 300, a gray voltage generator 800 connected to the data driver 500, and a signal controller 600 controlling the above elements.

Referring to FIG. 1, the panel assembly 300 includes a plurality of display signal lines $G_1$-$G_{2n}$ and $D_1$-$D_m$ and a plurality of pixels PX connected thereto and arranged substantially in a matrix. In a structural view shown in FIG. 2, the panel assembly 300 includes lower and upper panels 100 and 200 and a LC layer 3 interposed therebetween.

The display signal lines $G_1$-$G_{2n}$ and $D_1$-$D_m$ are disposed on the lower panel 100 and include a plurality of gate lines $G_1$-$G_{2n}$ transmitting gate signals (also referred to as "scanning signals"), and a plurality of data lines $D_1$-$D_m$ transmitting data signals. The gate lines $G_1$-$G_{2n}$ extend substantially in a row direction and substantially parallel to each other, while the data lines $D_1$-$D_m$ extend substantially in a column direction and substantially parallel to each other.

Each pixel PX includes a switching element Q connected to the signal lines $G_1$-$G_{2n}$ and $D_1$-$D_m$, and a LC capacitor $C_{LC}$ and a storage capacitor $C_{ST}$ that are connected to the switching element Q. In other embodiments, the storage capacitor CST may be omitted.

The switching element Q including a TFT is provided on the lower panel 100 and has three terminals: a control terminal connected to one of the gate lines $G_1$-$G_{2n}$; an input terminal connected to one of the data lines $D_1$-$D_m$; and an output terminal connected to both the LC capacitor $C_{LC}$ and the storage capacitor $C_{ST}$.

The LC capacitor $C_{LC}$ includes a pixel electrode 190 provided on the lower panel 100 and a common electrode 270 provided on an upper panel 200 as the two terminals of the LC capacitor. The LC layer 3 disposed between the two electrodes 190 and 270 functions as dielectric of the LC capacitor $C_{LC}$. The pixel electrode 190 is connected to the switching element Q, and the common electrode 270 is supplied with a common voltage Vcom and covers an entire surface of the upper panel 200. In other embodiments, the common electrode 270 may be provided on the lower panel 100, and at least one of the electrodes 190 and 270 may have a shape of a bar or a stripe.

The storage capacitor $C_{ST}$ is an auxiliary capacitor for the LC capacitor $C_{LC}$. The storage capacitor $C_{ST}$ includes the pixel electrode 190 and a separate signal line, 5 which is provided on the lower panel 100, overlapping the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel PX uniquely represents one of primary colors (i.e., spatial division) or each pixel PX sequentially represents the primary colors in turn (i.e., temporal division) such that spatial or temporal sum of the primary colors are recognized as a desired color. FIG. 2 shows an example of spatial division in that each pixel PX includes a color filter 230 representing one of the primary colors in an area of the upper panel 200 facing the pixel electrode 190. Alternatively, the color filter 230 is provided on or under the pixel electrode 190 on the lower panel 100.

An example of a set of the primary colors includes red, green, and blue colors. The pixels PX including red, green, and blue color filters are referred to as red, green, and blue pixels, respectively. A representative arrangement of red, green, and blue pixels is a stripe arrangement where each pixel row includes red, green, and blue pixels arranged in turn and each pixel column represents only one color.

One or more polarizers (not shown) are attached to at least one of the panels 100 and 200. In addition, one or more retardation films (not shown) for compensating refractive anisotropy may be disposed between the polarizer(s) and the panel(s).

Figure 3:
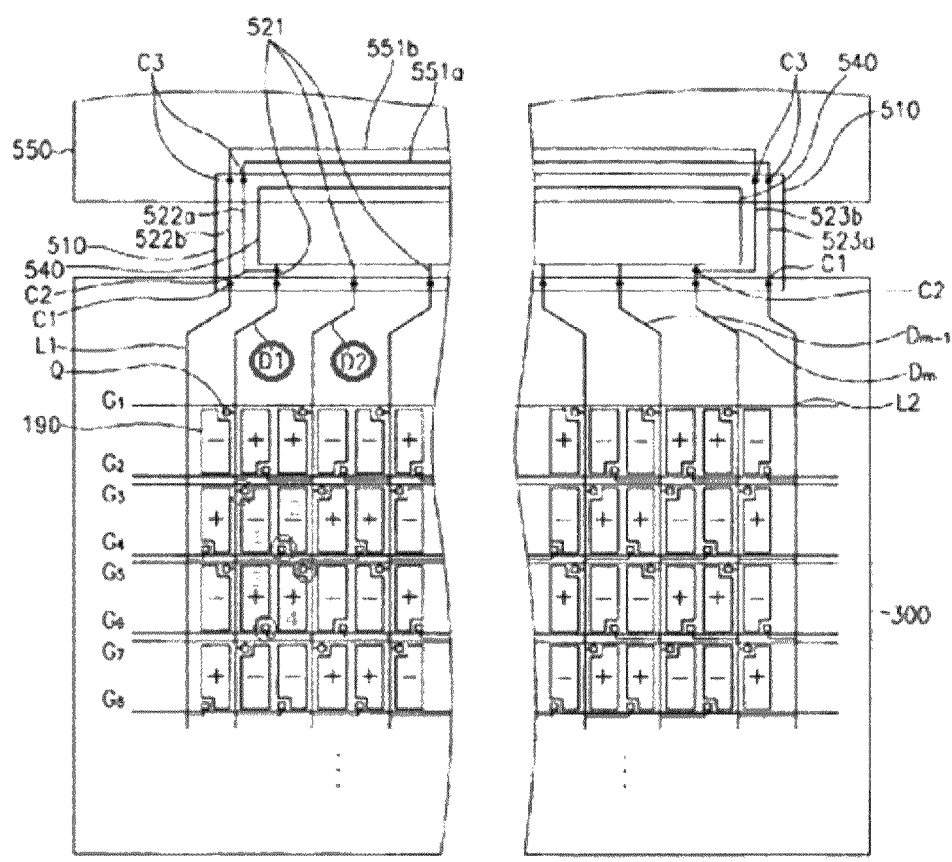
FIG. 3 schematically shows a structure of an LCD according to an embodiment of the present invention.

Referring to FIG. 3, a detailed configuration of an LCD according to an embodiment of the present invention is described.

FIG. 3 schematically shows a structure of an LCD according to an 30 embodiment of the present invention.

Referring to FIG. 3, an LCD according to this embodiment includes a panel assembly 300, a printed circuit board (PCB) 550, and at least one flexible printed circuit (FPC) film 510 attached to the panel assembly 300 and the PCB 550.

The PCB 550 is disposed near an upper edge of the panel assembly 300 and mounts several circuit elements such as the signal controller 600, the gray voltage generator 800, etc. The FPC film 510 mounts a data driving IC 540 and includes a plurality of output lead lines 521 connected to output terminals of the data driving IC 540 and a plurality of input lead lines (not shown) connected to input terminals of the data driving IC 540.

The panel assembly 300 includes gate lines ($G_1$, $G_2$), data lines ($D_1$, $D_2$, ...), and pixels and the pixels include pixel electrodes 190 and switching elements Q connected to the gate lines ($G_1$, $G_2$, ...), the data lines ($D_1$, $D_2$, ...), and the pixel electrodes 190. The data lines ($D_1$, $D_2$, ...) are connected to the lead lines 521 on the FPC film 510 through contact points C1.

The panel assembly 300 further includes left and right dummy lines L1 and L2 extending substantially parallel to the data lines (DI' D2, ...) and disposed left to the leftmost data line D1 and right to the rightmost data line $D_m$, respectively. The PCB 550 further includes a pair of bypass lines 551a and 551b and the FPC film 510 further includes two pairs of connection lines 522a, 522b, 523a and 523b.

The right dummy line L2 is electrically connected to a lead line 521, which is connected to the leftmost data line $D_m$, through the connection line 523a, the bypass line 551a, and the connection line 522a. Likewise, the left dummy line L1 is electrically connected to another lead line 521, which is connected to the rightmost data line $D_m$, through the connection line 522b, the bypass line 551b, and the connection line 523b. The connection lines 522b and 523b are connected to the dummy lines L1 and L2 at contact points C1 and the connection lines 522a and 523a are connected to the lead lines 521 at contact points C2. The connection lines 522a, 522b, 523a and 523b are connected to the bypass lines 551a and 551b at contact points C3.

Each pair of gate lines $G_{2i-1}$ and $G_{2i}$ (i=1, 2, ...) are disposed at the upper and lower sides of a row of pixel electrodes 190. Each data line $D_j$ (j=1, 2, 3, ...) is disposed between two adjacent columns of the pixel electrodes 190. In other words, each data line $D_j$ (j=1, 2, 3, ...) is disposed between adjacent pairs of pixel electrodes 190. The left dummy line L1 is disposed left to the leftmost pixel column and the right dummy line L2 is disposed right to the rightmost pixel column.

The pixel electrodes 190 are connected to the gate lines ($G_1$, $G_2$) and the data lines ($D_1$, $D_2$, ...) or the dummy lines L1 and L2 through the switching elements Q that are disposed near the corners of the pixel electrodes 190. (The connection between the pixel electrodes 190 and the dummy lines L1 and L2 will be omitted since the dummy lines L1 and L2 can be considered as the data lines ($D_1$, $D_2$, ...) in relation to the connection relation.) The corner positions of the pixel electrodes 190, which are assigned to the respective switching elements Q connected thereto, vary in rows and columns depending on the connection between the pixel electrode 190 and the gate lines ($G_1$, $G_2$, ...) and the data lines ($D_1$, $D_2$, ...). For example, a switching element Q for a pixel electrode 190 to be connected to an upper gate line $G_{2i-1}$ and a left data line ($D_1$, $D_2$, ...) is disposed near the upper left corner of the pixel electrode 190, which is the nearest corner from the upper gate line $G_{2i-1}$ and the left data line ($D_1$, $D_2$, ...).

A row of pixel electrodes 190 are alternately connected to a pair of gate lines $G_{2i-1}$ and $G_{2i}$ adjacent thereto and alternately connected to the nearest data line and the next nearest data line. A column of pixel electrodes 190 are alternately connected to upper gate lines $G_{2i-1}$ and lower gate lines $G_{2i}$ adjacent thereto and alternately connected to the nearest data line and the next nearest data line. Accordingly, a pair of pixel electrodes 190 disposed between two adjacent data lines and a pair of gate lines is connected to the same data line but to different gate lines.

The arrangement of the position of the switching elements in the pixel matrix and the connection to the respect gate lines and data lines can be described as follows. The pixels in each pixel row have switching element positioned alternately near an upper corner and a lower corner. The pixels in each pixel column have switching elements positioned alternately near an upper corner and a lower corner and also positioned alternately at a left side corner and a right side corner. A pair of gate lines is disposed at the upper and lower sides of each pixel row where the switching elements of the pixels in each pixel row are connected to the gate line positioned nearest the respective switching element. Each data line is disposed between adjacent pairs of pixel columns and connected to switching elements associated with the pairs of pixels where on pixel of the pairs has a switching element positioned nearest the respective data line. In one embodiment, each pair of pixels having switching elements connected to the same data line is disposed in the same pixel row. In another embodiment, two pixels in each pixel row disposed between two adjacent data lines have switching elements connected to the same data line. Finally, in yet another embodiment, two adjacent pixels in each pixel column have switching elements connected to different data lines.

This arrangement reduces the number of the data lines $D_1$, $D_2$, $D_3$, ... into half of the pixel columns and the arrangement and the connections of the pixel electrodes 190 with the gate lines and the data lines shown in FIG. 3 may be varied. Now, a lower panel of an LC panel assembly according to an embodiment of the present invention will be described in detail with reference to FIGS. 4-6 and FIG. 2.

Figure 4:
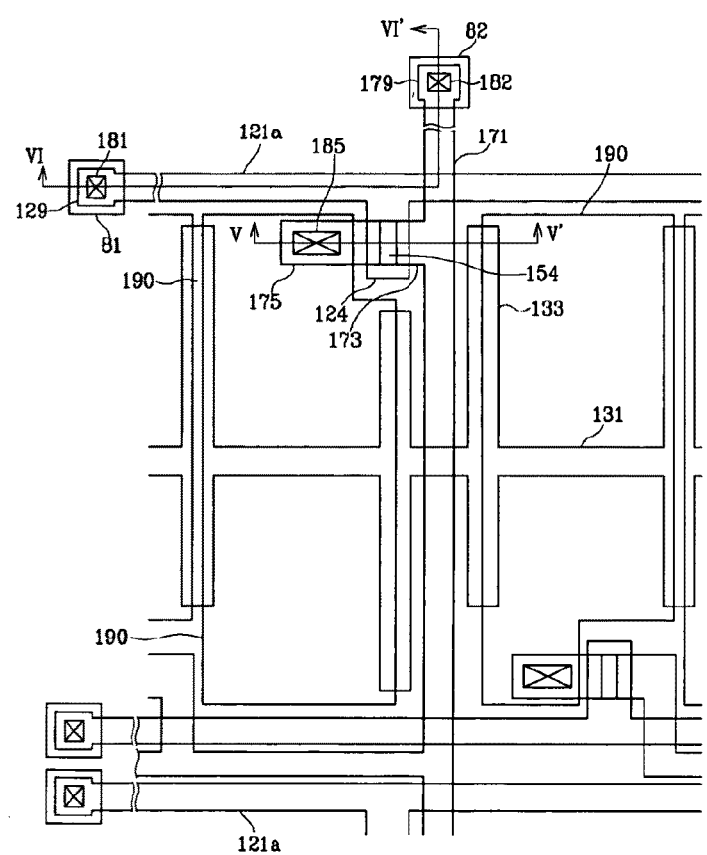
FIG. 4 is a layout view of a lower panel according to an embodiment of the present invention.
Figure 5:
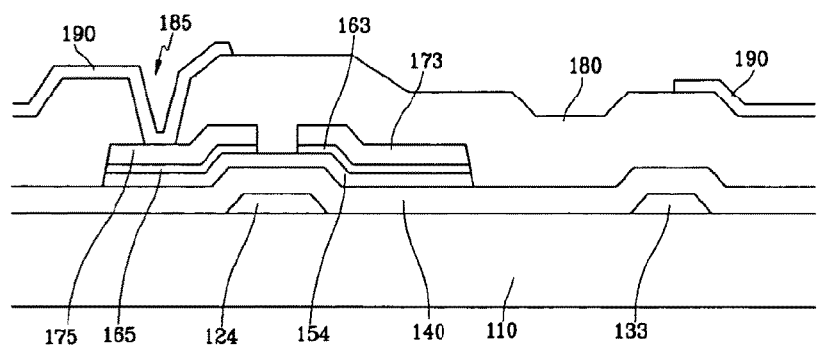
FIGS. 5 and 6 are sectional views of the lower panel shown in FIG. 4 taken along the lines V-V and VI-VI', respectively.
Figure 6:
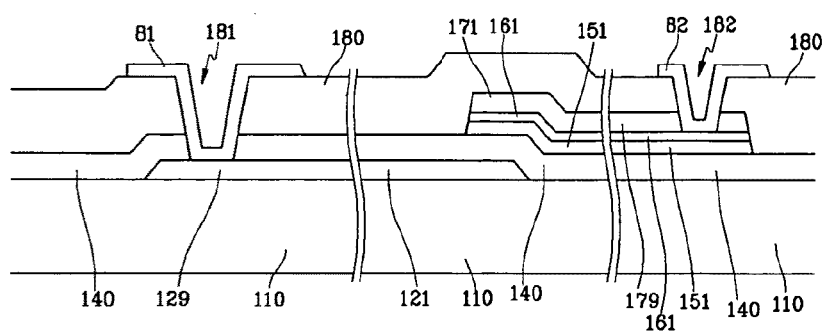

FIG. 4 is a layout view of a lower panel according to an embodiment of the present invention and FIGS. 5 and 6 are sectional views of the lower panel shown in FIG. 4 taken along the lines V-V and VI-VI', respectively. A plurality of pairs of gate lines 121a and 121b and a plurality of storage electrode lines 131 are formed on an insulating substrate 110 such as transparent glass.

The gate lines 121a and 121b extend substantially in a transverse direction to transmit gate signals and they are separated from each other. The pair of gate lines 121a and 121b include a plurality of gate electrodes 124 projecting toward each other, i.e., upward and downward. Each gate line 121a or 121b further includes an end portion 129 having a large area for contact with another layer or a driving circuit. The gate lines 121a and 121b may extend to be connected to a driving circuit that may be integrated on the lower panel 100.

Each storage electrode line 131 extends substantially in the transverse direction and is substantially equidistant from a pair of gate lines 121a and 121b. Each storage electrode line 131 includes a plurality of pairs of storage electrodes 133 extending in a longitudinal direction. The storage electrode lines 131 are supplied with a predetermined voltage such as a common voltage, which is applied to a common electrode 270 on the common electrode panel 200 of the LCD. Each storage electrode line 131 may include a pair of stems extending in the transverse direction and may have various shapes.

The gate lines 121a and 121b and the storage electrode lines 131 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ti or Ta. The gate lines 121a and 121b and the storage electrode lines 131 may have a multi-layered structure including two films having different physical characteristics. One of the two films is preferably made of low resistivity metal including Al containing metal, Ag containing metal, and Cu containing metal for reducing signal delay or voltage drop in the gate lines 121a and 121b and the storage electrode lines 131. The other film is preferably made of material such as Mo containing metal, Cr, Ta or Ti, which has good physical, chemical, and electrical contact characteristics with other materials such as indium tin oxide (ITO) or indium zinc oxide (IZO). Good examples of the combination of the two films are a lower Cr film and an upper Al (alloy) film and a lower Al (alloy) film and an upper Mo (alloy) film. However, they may be made of various metals or conductors.

The lateral sides of the gate lines 121a and 121b and the storage electrode lines 131 are inclined relative to a surface of the substrate, and the inclination angle thereof ranges about 20-80 degrees.

A gate insulating layer 140 preferably made of silicon nitride (SiNx) is formed on the gate lines 121a and 12tb and the storage electrode lines 131.

A plurality of semiconductor stripes 151 preferably made of hydrogenated amorphous silicon (abbreviated to "a-Si") or polysilicon are formed on the gate insulating layer 140. Each semiconductor stripe 151 extends substantially in the longitudinal direction and has a plurality of projections 154 branched out toward the gate electrodes 124.

A plurality of ohmic contact stripes and islands 161 and 165 preferably made of silicide or n+ hydrogenated a-Si heavily doped with n type impurity such as phosphorous are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate, and the inclination angles thereof are preferably in a range of about 30-80 degrees.

A plurality of data lines 171 and a plurality of drain electrodes 175 separated from the data lines 171 are formed on the ohmic contacts 161 and 165.

The data lines 171 extend substantially in the longitudinal direction to transmit data voltages and intersect the gate lines 121a and 121b and the storage electrode lines 131 such that each data line 171 passes between adjacent two pairs of the storage electrodes 133. Each data line 171 includes an end portion 179 having a large area for contact with another layer or an external device and a plurality of source electrodes 173 projecting toward the drain electrodes 175.

Each pair of source and drain electrodes 173 and 175 are disposed opposite each other with respect to a gate line 124. A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The data lines 171 and the drain electrodes 175 are preferably made of refractory metal such as Cr, Mo, Ti, Ta or alloys thereof. However, they may have a multilayered structure including a low-resistivity film (not shown) and a good-contact film (not shown). Good example of the multi-layered structure are a double-layered structure including a lower Cr film and an upper Al (alloy) film, a double-layered structure of a lower Mo (alloy) film and an upper Al (alloy) film, and a triple-layered of a lower Mo film, an intermediate Al film, and an upper Mo film.

Like the gate lines 121a and 121b and the storage electrode lines 131, the data lines 171 and the drain electrodes 175 have inclined edge profiles, and the inclination angles thereof range about 30-80 degrees.

The ohmic contacts 161 and 165 are interposed only between the underlying semiconductor stripes 151 and the overlying conductors 171 and 175 thereon and reduce the contact resistance therebetween. The semiconductor stripes 151 have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175. Alternatively, only the projections 154 may be remained without other portions of the semiconductor stripes 151.

A passivation layer 180 is formed on the data lines 171 and the drain electrodes 175, and the exposed portions of the semiconductor stripes 151. The passivation layer 180 is preferably made of inorganic insulator such as silicon nitride or silicon oxide, photosensitive organic material having a good flatness characteristic, or low dielectric insulating material that have dielectric constant lower than 4.0 such as a-Si:C:O and a-Si:O:F formed by plasma enhanced chemical vapor deposition (PECVD). The passivation layer 180 may have a double-layered structure including a lower inorganic film and an upper organic film so that it may take the advantage of the organic film as well as it may protect the exposed portions of the semiconductor stripes 151.

The passivation layer 180 has a plurality of contact holes 182 and 185 exposing the end portions 179 of the data lines 171 and the drain electrodes 175, respectively. The passivation layer 180 and the gate insulating layer 140 have a plurality of contact holes 181 exposing the end portions 129 of the gate lines 121.

A plurality of pixel electrodes 190 and a plurality of contact assistants 81 and 82, which are preferably made of transparent conductor such as ITO or IZO or reflective conductor such as Ag or Al, are formed on the passivation layer 180.

The pixel electrodes 190 are physically and electrically connected to the drain electrodes 175 through the contact holes 185 such that the pixel electrodes 190 receive the data voltages from the drain electrodes 175. The pixel electrodes 190 supplied with the data voltages generate electric fields in cooperation with the common electrode 270 supplied with the common voltage, which determine the orientations of liquid crystal molecules in the liquid crystal layer 3.

As described above, a pixel electrode 190 and a common electrode 270 form a liquid crystal capacitor $C_{LC}$, which stores applied voltages after the TFT turns off. A storage capacitor $C_{ST}$, which is connected in parallel to the liquid crystal capacitor $C_{LC}$ for enhancing the voltage storing capacity, is implemented by overlapping the pixel electrode 190 with a storage electrode line 131 including the storage electrodes 133.

The pixel electrodes 190 have longitudinal edges disposed on the storage electrodes 133 so that the storage electrodes 133 block the interference between the pixel electrodes 190 and the data lines 171 and the interference between the pixel electrodes 190.

The contact assistants 81 and 82 are connected to and cover the end portions 121 of the gate lines 121 and the end portions 179 of the data lines 171 through the contact holes 181 and 182, respectively. The contact assistants 81 and 82 protect the end portions 129 and 179 and complement the adhesion of the end portions 129 and 179 and external devices.

An alignment layer (not shown) for initially aligning the LC molecules is coated on the pixel electrodes 190 and the passivation layer 180.

Referring to FIG. 1 again, the gray voltage generator 800 generates two sets of a plurality of gray voltages related to the transmittance of the pixels. The gray voltages in one set have a positive polarity with respect to the common voltage Vcom, while those in the other set have a negative polarity with respect to the common voltage V com.

The gate driver 400 is connected to the gate lines $G_1$-$G_{2n}$ of the panel assembly 300 and synthesizes the gate-on voltage Von and the gate-off voltage Voff from an external device to generate gate signals for application to the gate lines $G_1$-$G_{2n}$.

The data driver 500 is connected to the data lines $D_1$-$D_m$ of the panel assembly 300 and applies data voltages, which are selected from the gray voltages supplied from the gray voltage generator 800, to the data lines $D_1$-$D_m$.

The drivers 400 and 500 may include at least one integrated circuit (IC) chip mounted on the panel assembly 300 or on a flexible printed circuit (FPC) film in a tape carrier package (TCP) type, which are attached to the LC panel assembly 300. Alternately, the drivers 400 and 500 may be integrated into the panel assembly 300 along with the display signal lines $G_1$-$G_{2n}$ and $D_1$-$D_m$ and the TFT switching elements Q.

The signal controller 600 controls the gate driver 400 and the gate driver 500.

Now, the operation of the above-described LCD will be described in detail.

The signal controller 600 is supplied with input image signals R, G and B and input control signals controlling the display thereof such as a vertical synchronization signal Vsync, a horizontal synchronization signal Hsync, a main clock MCLK, and a data enable signal DE, from an external graphics controller (not shown). After generating gate control signals CONT1 and data control signals CONT2 and processing the image signals R, G and B suitable for the operation of the panel assembly 300 on the basis of the input control signals and the input image signals R, G and B, the signal controller 600 transmits the gate control signals CONT1 to the gate driver 400, and the processed image signals DAT and the data control signals CONT2 to the data driver 500. The processing of the image signals R, G and B includes the rearrangement of the image data R, G and B according to the pixel arrangement of the panel assembly 300 shown in FIG. 3.

The gate control signals CONT1 include a scanning start signal STV for instructing to start scanning and at least a clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing of start of data transmission for a group of pixels, a load signal LOAD for instructing to apply the data voltages to the data lines $D_1$-D, and a data clock signal HCLK. The data control signal CONT2 may further include an inversion signal RVS for reversing the polarity of the data voltages (with respect to the common voltage Vcom).

Responsive to the data control signals CONT2 from the signal controller 600, the data driver 500 receives a packet of the image data DAT for half of a row of pixels from the signal controller 600, converts the image data DAT into analog data voltages selected from the gray voltages supplied from the gray voltage generator 800, and applies the data voltages to the data lines $D_1$-$D_m$.

The gate driver 400 applies the gate-on voltage Von to the gate line $G_1$-$G_{2n}$ in response to the gate control signals CONT1 from the signal controller 600, thereby turning on the switching elements Q connected thereto. The data voltages applied to the data lines DI-Dm are supplied to the pixels through the activated switching elements Q.

The difference between the data voltage and the common voltage Vcom is represented as a voltage across the LC capacitor $C_{LC}$, which is referred to as a pixel voltage. The LC molecules in the LC capacitor $C_{LC}$ have orientations depending on the magnitude of the pixel voltage, and the molecular orientations determine the polarization of light passing through the LC layer 3. The polarizer(s) converts the light polarization into the light transmittance.

By repeating this procedure by a unit of half of a horizontal period (which is denoted by "½H" and equal to half period of the horizontal synchronization signal Hsync or the data enable signal DE), all gate lines $G_1$-$G_{2n}$ are sequentially supplied with the gate-on voltage Von during a frame, thereby applying the data voltages to all pixels. When the next frame starts after one frame finishes, the inversion control signal RVS applied to the data driver 500 is controlled such that the polarity of the data voltages is reversed (which is referred to as "frame inversion").

Other than the frame inversion, the data driver 500 varies the polarity of the data voltages flowing in each data line during one frame, thereby varying the polarity of the pixel voltages. Since the connections between the pixels and the data lines $D_1$-$D_m$ are complex as shown in FIG. 3, the polarity inversion pattern generated by the data driver 500 is different from that of the pixel voltages appearing on the panel assembly 300. Hereinafter, the polarity inversion of the data driver 500 is referred to as driver inversion" and the polarity inversion appearing on the panel assembly 300 is referred to as II apparent inversion."

The polarity inversion pattern shown in FIG. 3 is a driver inversion of a column inversion and an apparent inversion of 1×2 dot inversion. The driver column inversion means that the polarity of the data voltages in each data line is fixed and the polarity of the data voltages in adjacent data lines is opposite. The apparent 1×2 dot inversion means that the polarity is inverted every row and every two columns.

The above-described arrangements of the switching elements of the pixels realize a 1×2 dot-type apparent inversion for a given column-type driver inversion. The column-type driver inversion diversifies materials available for the data lines and thus it is easy to find a material suitable for simplifying the manufacturing process. In addition, the dot-type apparent inversion disperses the difference in the luminance due to the kickback voltages between the positive-polarity pixel voltages and the negative-polarity pixel voltages to thereby reduce vertical line defect.

The above-described structure and driving scheme according to the embodiment of the present invention reduce the number of the data driving IC chips and ensure the image quality. The present invention can be also employed to other display devices such As OLED.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A display device comprising:
   a substrate;
   a first gate line, a second gate line, a third gate line, and a fourth gate line disposed on the substrate;
   a first data line and a second data line disposed on the substrate;
   a first switching element connected to the first gate line and the first data line, a second switching element connected to the second gate line and the first data line, a third switching element connected to the fourth gate line and the second data line, and a fourth switching element connected to the third gate line and the second data line; and
   a first pixel electrode connected to the first switching element, a second pixel electrode connected to the second switching element, a third pixel electrode connected to the third switching element, and a fourth pixel electrode connected to the fourth switching element on the substrate;
   wherein the first pixel electrode and the second pixel electrode are disposed in a first pixel row and the third pixel electrode and the fourth pixel electrode are disposed in a second pixel row,
   wherein the first pixel electrode and the third pixel electrode are disposed in a first pixel column and the second pixel electrode and the fourth pixel electrode are disposed in a second pixel column; and
   wherein the second gate line and the third gate line are disposed between the first pixel row and the second pixel row.

2. The display device of claim 1, wherein the first gate line, the second gate line, the third gate line, and the fourth gate line are disposed sequentially.

3. The display device of claim 2, wherein the first gate line and the second gate line are disposed at upper and lower sides of the first pixel row and the third gate line and the fourth gate line are disposed at upper and lower sides of the second pixel row.

4. The display device of claim 3, wherein the first pixel column and the second pixel column are disposed between the first data line and the second data line.

5. The display device of claim 4, wherein the polarities of data voltages transmitted by the first data line and the second data line are opposite to each other.

6. The display device of claim 5, wherein the polarity of the data voltages transmitted by each of the first data line and the second data line is constant.

7. The display device of claim 6, wherein an apparent inversion of the display device is 1×2 dot inversion.

8. The display device of claim 1, wherein the first pixel column and the second pixel column are disposed between the first data line and the second data line.

9. The display device of claim 8, wherein the polarities of data voltages transmitted by the first data line and the second data line are opposite to each other.

10. The display device of claim 9, wherein the polarity of the data voltages transmitted by each of the first data line and the second data line is constant.

11. The display device of claim 10, wherein an apparent inversion of the display device is 1×2 dot inversion.

\* \* \* \* \*